United States Patent
Boezen et al.

(10) Patent No.: US 7,095,751 B2
(45) Date of Patent: Aug. 22, 2006

(54) ACTIVE SWITCHING STAR NODE AND NETWORK OF STATIONS INTERCONNECTED BY SUCH A STAR NODE

(75) Inventors: Hendrik Boezen, Nijmegen (NL); Stefan Gerhard Erich Butselaar, Nijmegen (NL); Harm Gerwin Joan Voss, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 959 days.

(21) Appl. No.: 10/095,398

(22) Filed: Mar. 11, 2002

(65) Prior Publication Data

US 2002/0141430 A1   Oct. 3, 2002

(30) Foreign Application Priority Data

Mar. 12, 2001   (EP)   ................................. 01200905

(51) Int. Cl.
  *H04L 12/28* (2006.01)
  *H04L 12/56* (2006.01)
(52) U.S. Cl. ...................... 370/425; 370/462
(58) Field of Classification Search ................ 370/401, 370/402, 403, 252, 254, 241, 216, 229, 351, 370/352, 353, 354, 356, 425, 462, 355; 307/112, 307/115
  See application file for complete search history.

(56) References Cited

U.S. PATENT DOCUMENTS 4,805,234 A * 2/1989 Husbands ................ 398/58
4,903,015 A  2/1990 Van Steenbrugge et al. ..... 340/825
5,838,683 A * 11/1998 Corley et al. ............... 370/408

FOREIGN PATENT DOCUMENTS

EP   0698978 A2   8/1995

* cited by examiner

*Primary Examiner*—Ajit Patel
(74) *Attorney, Agent, or Firm*—Adam L. Stroud

(57) ABSTRACT

In a network a star node (SN1) interconnects a plurality of stations (ST1–ST3). The star node (SN1) has interfaces (I1–I3), each having a connection terminal (BP) for connecting a selected one of the stations to the star node (SN1) and each interface receives at a connection terminal (BP) a signal from the station associated with that interface and forwards the received signal to the connection terminal (BP) of the other interfaces. The star node (SN1) further has a common terminal (RT1) and each interface has a receiver (CMP1) coupled to the connection terminal (BP) for receiving the signal from the associated station, a transmitter (TR) coupled to the connection terminal (BP), a first activity detector (A1) for generating a first activity signal (AS1) in response to signal transitions at an input (CIP1) of the receiver (CMP1), a second activity detector (A2) for generating a second activity signal (AS2) in response to signal transitions at the common terminal (RT1), a first switch (SW1) for disabling signal transfer from the receiver (CMP1) to the common terminal (RT1) in response to the second activity signal (AS2), and a second switch (SW2) for disabling signal transfer from the common terminal (RT1) to the transmitter (TR) in response to the first activity signal (AS1). The structure of the interface allows easy expansion of the number of interfaces within the star node (SN1) and a data protocol without a preamble.

8 Claims, 5 Drawing Sheets

Figure 1:
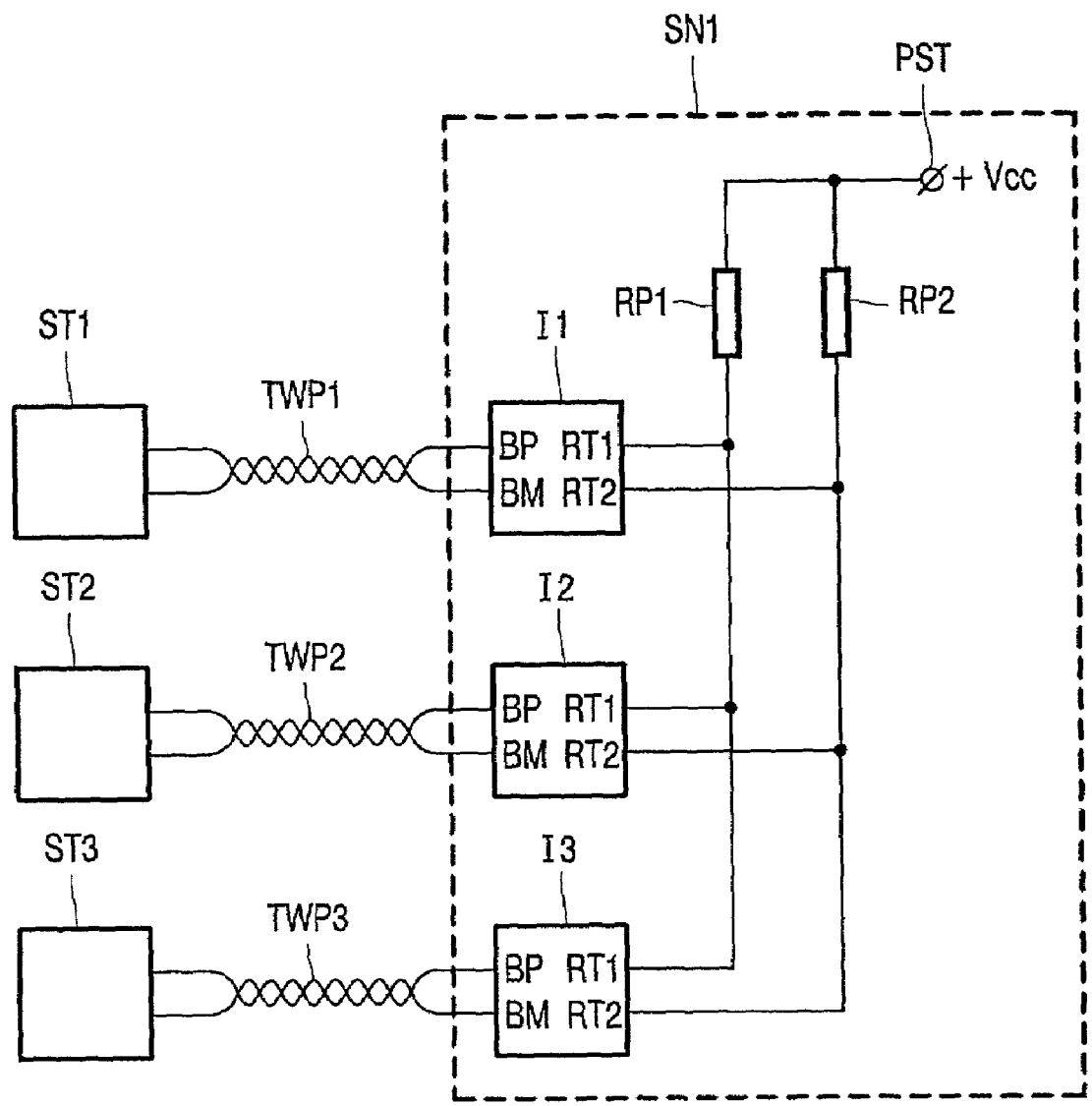
Figure 2:
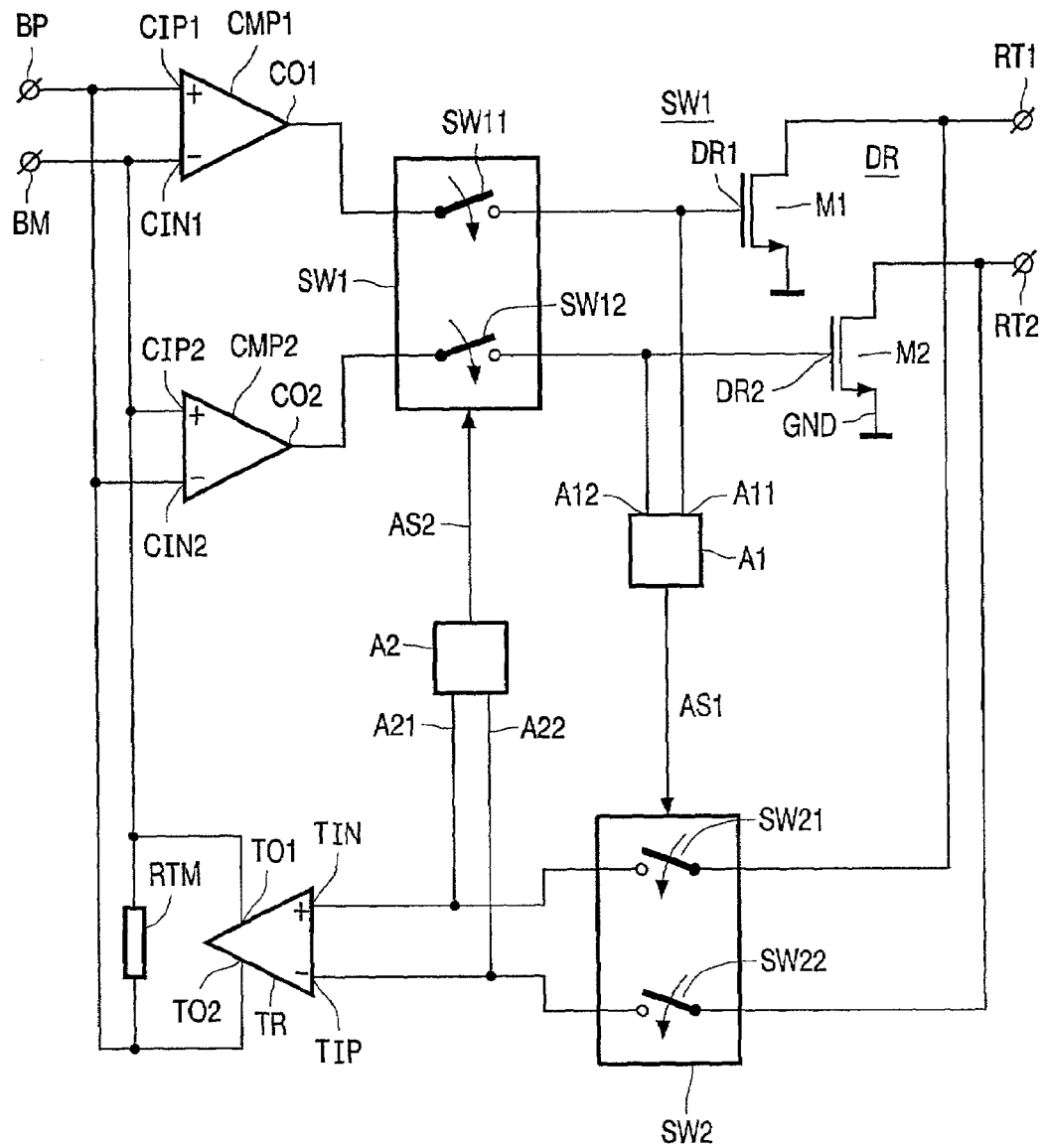

ACTIVE SWITCHING STAR NODE AND NETWORK OF STATIONS INTERCONNECTED BY SUCH A STAR NODE

The invention relates to a star node (SN1) for interconnecting a plurality of stations (ST1–ST3) in a network, the star node (SN1) comprising interfaces (I1–I3), each having a connection terminal (BP) for connecting a selected one of the stations to the star node (SN1), each interface having means for accepting at the connection terminal (BP) a signal from the station associated with the interface and for forwarding said signal to the connection terminal (BP) of the other interfaces.

The invention also relates to a network of stations interconnected by such a star node. This kind of networks may be used, for example, in cars and other noisy environments.

In a network, in particular a high speed network, reflections in the network can cause signal integrity problems. This is especially important if the bit time is not large with respect to the propagation delay through the network. A network can be made where all stations are connected to a star node with properly terminated transmission lines. In such a star type network, the star node's task is to retransmit data received from one of the stations to all other stations. Such a star type network and star node are known from U.S. Pat. No. 4,903,015. This known network has properly terminated transmission lines and is hence suitable for high speed. The signals sent to and received from the stations run through the same transmission line, which saves connectors and wires. However, in the star node of this known network a fairly complicated logic circuit is required to realize the send-and-receive switching mechanism. The complexity of the logic circuit grows with the number of stations that can be connected to the star node.

It is an object of the invention to provide a star node with reduced complexity. Thereto, according to the invention a star node defined in the opening paragraph is characterized in that the star node comprises a common terminal and in that the interface comprises a receiver having an input coupled to the connection terminal for receiving the signal from the associated station, a transmitter having an output coupled to the connection terminal, a first activity detector for generating a first activity signal in response to signal transitions at the input of the receiver, a second activity detector for generating a second activity signal in response to signal transitions at the common terminal, a first switching means for disabling signal transfer from an output of the receiver to the common terminal in response to the second activity signal, and a second switching means for disabling signal transfer from the common terminal to an input of the transmitter in response to the first activity signal.

The first en second switching means, in combination with the first and second activity detectors, prevent the incoming signal from the associated station of an interface being sent back to the same station and ensure that the incoming signal is routed only to the other stations. All interfaces are identical and the number of components does not increase with increasing number of interfaces.

In the embodiment claimed in dependent claim 2 the drivers of the interfaces, the resistor and the common terminal constitute a wired-OR system which can be expanded at will. The electronic switches provide the correct routing of the signals.

The embodiments claimed in dependent claims 3 and 4, and in dependent claims 6 and 7 provide fast and simple implementations and the embodiment claimed in claims 5 and 8 is a fully balanced implementation.

The simplicity of the star node according to the invention enables fast and efficient data transmission as hardly no time is lost to configure the star node. Hence no preamble in the protocol of the transmitted data is needed to create time to perform switching functions in the star node. This makes a network equipped with the star node according to the invention suitable for protocols that do not specify a preamble, such as TTP/C (Time Triggered Protocol Class C (high speed, $\geqq$1 Mbit/sec)). The star node according to the invention further allows easy expansion. Star nodes can be added by connecting one of the interfaces to an interface of another star node.

These and other aspects of the invention will now be described and elucidated with reference to the accompanying drawings, in which FIG. 1 shows a network with stations interconnected through a star node according to the invention;

FIG. 2 shows a block diagram of a first interface for use in a star node according to the invention;

FIG. 3 shows signals occurring in a first interface which receives data from a station;

FIG. 4 shows signals occurring in a first interface which sends data to a station;

FIG. 5 shows a block diagram of a second interface for use in a star node according to the invention; and FIG. 6 shows the network of FIG. 1 in which one of the stations has been replaced by another star node.

In these Figures like parts bear like reference symbols.

FIG. 1 shows a network comprising, by way of example, three stations ST1, ST2 and ST3 interconnected through a star node SN1 according to the invention. In a car the station can be a temperature sensor, a brake sensor, a door sensor, and the like provided with a suitable interface for connection of the sensor to the network. The star node SN1 comprises, again by way of example, three interfaces I1, I2 and I3. The interfaces I1, I2 and I3 have respective connection terminals BP and BM for connection of a respective one of the stations ST1, ST2 and ST3 to the star node SN1. The stations ST1, ST2 and ST3 are connected to the interfaces I1, I2 and I3 by twisted pair transmission lines TWP1, TWP2 and TWP3. However, other types of transmission lines are also possible, such as coaxial cables and single wire lines. The number of stations and interfaces is not limited to three; any number greater than two is possible.

The interfaces I1, I2 and I3 have balanced inputs BP and BM for connection of the twisted pair transmission lines and further have balanced common terminals RT1 and RT2. The common terminals RT1 of the interfaces I1, I2 and I3 are all connected to a positive supply terminal PST through a first common pull-up resistor RP1. The common terminals RT2 of the interfaces I1, I2 and I3 are similarly all connected to the positive supply terminal PST through a second common pull-up resistor RP2.

FIG. 2 shows a block diagram of the interfaces I1–I3. The interface has a receiver comprising of two comparators CMP1 and CMP2 and a transmitter TR. Comparator CMP1 has a non-inverting input CIP1 connected to the connection terminal BP and has an inverting input CIN1 connected to the connection terminal BM. Comparator CMP2 has a non-inverting input CIP2 connected to the connection terminal BM and has an inverting input CIN2 connected to the connection terminal BP. The inputs of the two comparators are thus oppositely connected to the connection terminals. The transmitter TR has balanced outputs TO1 and T02 connected to the connection terminals BM and BP, respectively. A termination resistor RTM is connected between the connection terminals BP and BM for providing a correct termination impedance to the twisted pair transmission line of the connected station.

The interface further has first and second signal activity detectors A1 and A2. The first signal activity detector A1 detects changes in the incoming signal, i.e. in the signal received by the receiver from the station connected to the interface. The second activity detector detects changes in the outgoing signal, i.e. in the signal sent by the transmitter to the station connected to the interface.

The two comparators CMP1 and CMP2 have respective outputs CO1 and CO2 coupled to the common terminals RT1 and RT2 through first switching means SW1. The first switching means SW1 disable signal transfer from the outputs CO1 and CO2 to the common terminals RT1 and RT2 under control of a second activity signal AS2 from the second activity detector A2. The first switching means SW1 are used with first and second electronic switches SW1 and SW12 which are normally closed and are opened at the command of the second activity signal AS2 from the second activity detector AS2. The first and second electronic switches SW11 and SW12 connect and disconnect the outputs CO1 and CO2 to and from first and second driving inputs DR1 and DR2, respectively, of a driver DR which pulls down or releases the common terminals RT1 and RT2 under control of complementary driving signals supplied by the outputs CO1 and CO2 of the comparators CMP1 and CMP2.

The driver DR is used with first and second N-channel transistors M1 and M2. The channel of the first transistor M1 is connected between the first common terminal RT1 and a negative supply voltage terminal GND which serves as signal ground. The control electrode or gate of the first transistor M1 operates as the driving input DR1. Upon receipt of a positive signal at its gate the channel of the first transistor M1 forms a current conduction path between the common terminal RT1 and the negative supply terminal GND and the first transistor M1 pulls the voltage at the first common terminal RT1 down to ground level. The channel of the second transistor M2 is connected between the second common terminal RT2 and the negative supply voltage terminal GND. The gate of the second transistor M2 operates as the driving input DR2. Upon receipt of a positive signal at its gate the channel of the transistor M2 forms a current conduction path between the second common terminal RT2 and the negative supply terminal GND and the second transistor M2 pulls the voltage at the second common terminal RT2 down to ground level.

The common pull-up resistors RP1 and RP2 and the first and second transistors M1 and M2 of the respective interfaces I1, I2 and I3 constitute a simple wired-OR interconnection system between the interfaces, which allows a simple expansion to any number of interfaces within the star node SN1 without the need to increase or change the electronic design of the individual interfaces in dependence of the number of interfaces. All interfaces have the same circuitry.

Instead of common pull-up resistors RP1, RP2 and corresponding pull-down transistors M1, M2, the driver DR may alternatively be implemented with other driver stages capable of presenting a low or a high impedance between the first and second common terminals RT1 and RT2 under control of balanced signals from the outputs CO1 and CO2 of the comparators CMP1 and CMP2.

The transmitter TR has an inverting input TIN and a non-inverting input TIP coupled to the first and second common terminals RT1 and RT2, respectively, through second switching means SW2. The second switching means SW2 disable signal transfer from the common terminals RT1 and RT2 to the inverting input TIN and the non-inverting input TIP under control of a first activity signal AS1 from the first activity detector A2. The second switching means SW2 are implemented with first and second electronic switches SW21 and SW22, which are normally closed and which are opened at the command of the first activity signal AS1 from the first activity detector AS1. The first and second electronic switches SW21 and SW22 of the second switching means SW2 connect and disconnect the first and second common terminals RT1 and RT2 to and from the inverting input TIN and the non-inverting input TIP of the transmitter TR.

The first activity detector A1 has inputs A11 and A12 connected to the driving inputs DR1 and DR2 in order to detect signal activity in the incoming signal. Alternatively, these inputs A11 and A12 may be connected to the connection terminals BP and BM, or to the outputs CO1 and CO2, to obtain the same effect. The second activity detector A2 has inputs A21 and A22 connected to, respectively, the inverting input TIN and the non-inverting input TIP of the transmitter TR in order to detect signal activity in the outgoing signal. Alternatively, these inputs A21 and A22 may be connected to the common terminals RT1 and RT2, or to the connection terminals BP and BM, to obtain the same effect.

Figure 3:
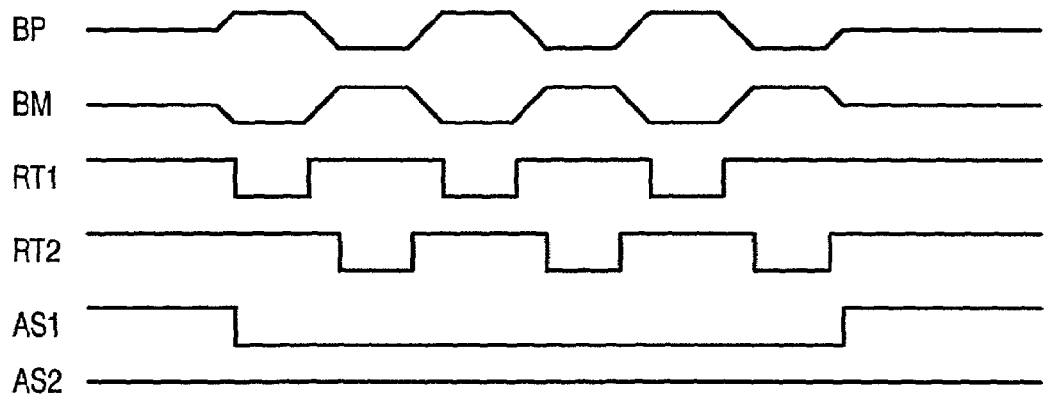
Figure 4:
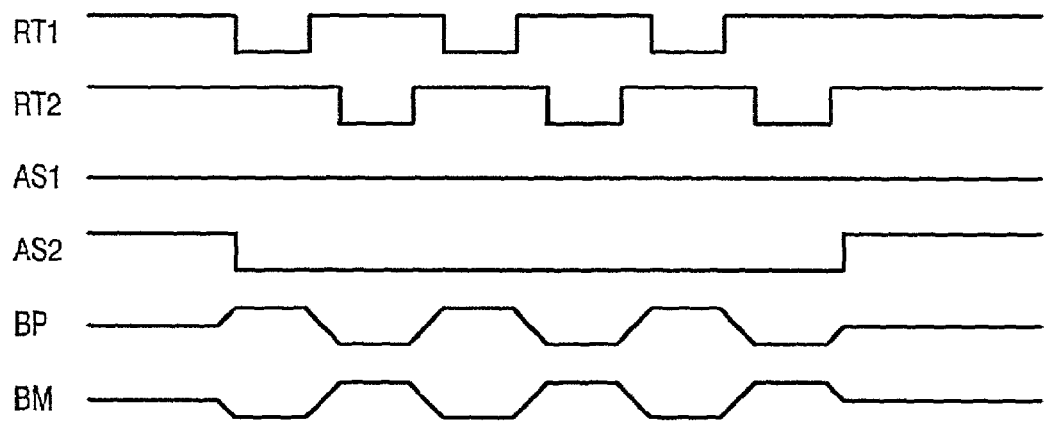

FIG. 3 shows signals occurring in an interface which receives data from a station, from top to bottom: the complementary data signals at the connection terminals BP and BM, the signals at the common terminals RT1 and RT2, the first activity signal AS1 and the second activity signal AS2. FIG. 4 shows the corresponding signals occurring in an interface which sends data to a station.

In the network data are transmitted from station to station as complementary voltage differences between the connection terminals BP and BM which change polarity depending on the content of the data. When no data are transmitted, the voltage difference between the connection terminals BP and BM is zero and the network is in the idle state. Assuming that station ST1 is the sending station, then in interface I1 the voltage differences are sensed by the two comparators CMP1 and CMP2 which have built-in thresholds to suppress noise on the received data signals. The output signals of the comparators drive the gates of the first and second transistors M1 and M2 through the electronic switches SW11 and SW12 which are normally closed. The first activity detector A1 detects the incoming signal differences and quickly activates the second switching means SW2 with its first activity signal AS1. This opens the first and second electronic switches SW21 and SW22 of the second switching means SW2 and the signals on the first and second common terminals RT1 and RT2 are disconnected from the inputs TIN and TIP of the transmitter TR. The electronic switches SW11 and SW12 remain closed as no signal activity is present in the outgoing branch of the interface. For proper operation the first activity detector A1 must open the electronic switches SW21 and SW22 before the data signals from the common terminals RT1 and RT2 reach the inputs A21 and A22 of the second activity detector A2, so that the incoming signal is not disturbed.

The other interfaces I2 and I3 do not receive an incoming signal from a station at their connection terminals BP and BM, but they share the signals at the common terminals RT1 and RT2 generated by the receiving interface I1. In the other interfaces I2 and I3 the switches SW21 and SW22 are closed because their first activity detector A1 does not sense signal differences in the incoming signal. However, the signal differences at the common terminals RT1 and RT2 are sensed by their first activity detector A1 and this causes the first and second electronic switches SW11 and SW12 to be opened in response to the second activity signal AS2. So, in the other interfaces I2 and I3 the signals at the common terminals RT1 and RT2 are connected to the inputs TIN and TIP of the transmitter TR and sent to the stations connected to the other interfaces. The open switches SW11 and SW12 prevent disturbance of the signals at the common terminals. For proper operation the second activity detector A2 must open the electronic switches SW11 and SW12 before the data signals transmitted by the transmitter TR reach the inputs A11 and A12 of the first activity detector A1.

In this way a data flow path is maintained from station ST1 to stations ST2 and ST3 as long as station ST1 remains transmitting. When station ST1 stops transmitting data, the voltage difference between the connection terminals BP and BM of interface I1 becomes zero and the network is in the idle state. In interface I1 the first activity detector A1 stops detecting activity and the electronic switches SW21 and SW22 of the second switching means SW2 return to their normally closed position and reconnect the common terminals RT1 and RT2 to the inputs TIN and TIP of the receiver TR of interface I1. Since the network is in the idle state, the signals at the common terminals RT1 and RT2 remain at high voltage level indicating the idle state. This in turn causes the electronic switches SW11 and SW12 of the other interfaces I2 and I3 to return to their normally closed position. Now all switches in all interfaces are closed and the star node SN1 is ready to receive new data signals from any one of the stations.

In the idle state the transmitters and receivers of all interfaces are active and connected to the network, so all data paths are fully open. Any message from a station will be relayed undamaged and quickly by the star node SN1. This means that it is easy to cascade star nodes to expand the network. The fast operation of the star node SN1 makes it also suitable in networks using protocols, such as TTP/C, which do not specify a preamble to allow settling time for the star node to rearrange the interconnections between the stations. Also the interframe gap can be made smaller, so that the available bandwidth for the actual data is increased. The interframe gap is the time that must be reserved to allow switching from one sending station to another sending station. This time is lost for data transmission.

The activity detectors A1 and A2 may consist of a capacitor which is charged slowly when the network is in the idle state, i.e. when the voltage difference between the connection terminals BP and BM is zero, and which is discharged quickly when data are transmitted, i.e. when voltage differences are sensed by the comparators CMP1 and CMP2.

Figure 5:
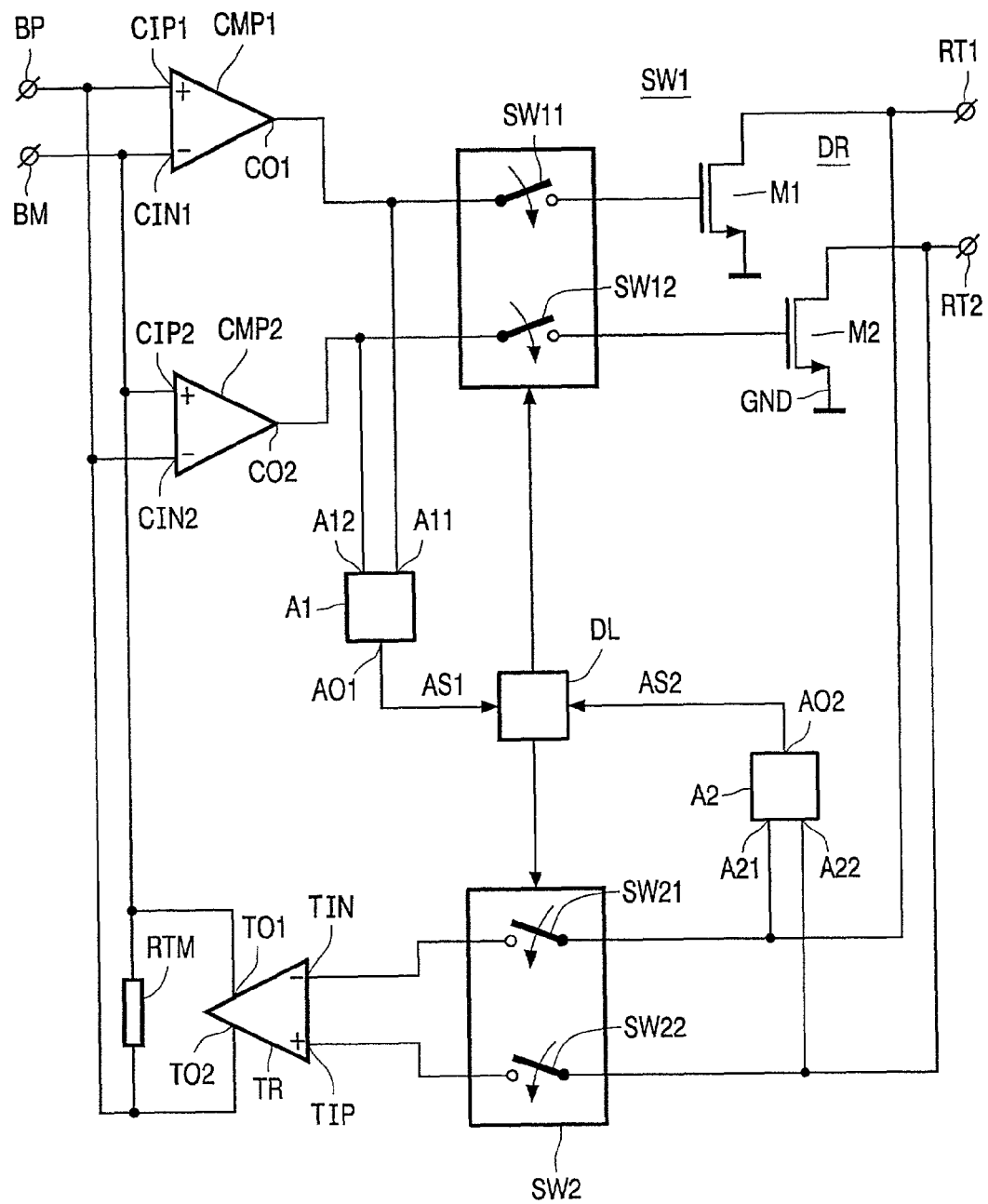

As already remarked, the inputs A11 and A12 may be connected to the outputs CO1 and CO2, and the inputs A21 and A22 may be connected to the common terminals RT1 and RT2, or to the connection terminals BP and BM, to obtain the same switching effect. FIG. 5 shows an interface with this connection structure. The activity signals AS1 and AS2 are supplied to inputs of a decision logic DL which supplies drive signals to open and close the switches SW11, SW12, SW21 and SW22. The first activity signal AS1 quickly assumes a high level if one of the outputs CO1 and CO2 assumes a high level, and the first activity signal AS1 returns to a low level some time after both outputs CO1 and CO2 having assumed a low level, i.e. when no activity occurs. The second activity detector A2 works in a similar way. The second activity signal AS2 quickly assumes a high level if one of the common terminals RT1 and RT2 assumes a low level, and the second activity signal AS2 returns to a low level some time after both outputs RT1 and RT2 have assumed a high level.

The decision logic DL has three states: idle, receive and transmit. When both the first activity signal AS1 and the second activity signal AS2 are low, the decision logic DL is in the idle state and switches SW11, SW12, SW21 and SW22 are all closed. When the first activity signal AS1 assumes the high level, there is activity at the connection terminals BP and BM and the decision logic DL is in the receive state. In the receive state the switches SW11 and SW12 remain closed and the switches SW21 and SW22 are opened. Due to activity at the common terminals RT1 and RT2 the second activity signal AS2 assumes the high level, but this does not change the state of the decision logic DL. The decision logic DL can only return to the idle state when both the first and second activity signals AS1 and AS2 are low. When the activity at the connection terminals BP and BM stops, the first activity signal AS1 goes low and shortly after that the second activity signal AS2 goes low and the decision logic DL returns to its idle state. The transmit state occurs when the second activity detector A2 is the first to detect activity at the common terminals RT1 and RT2. Then the switches SW11 and SW12 are opened and the switches SW21 and SW22 remain closed.

Figure 6:
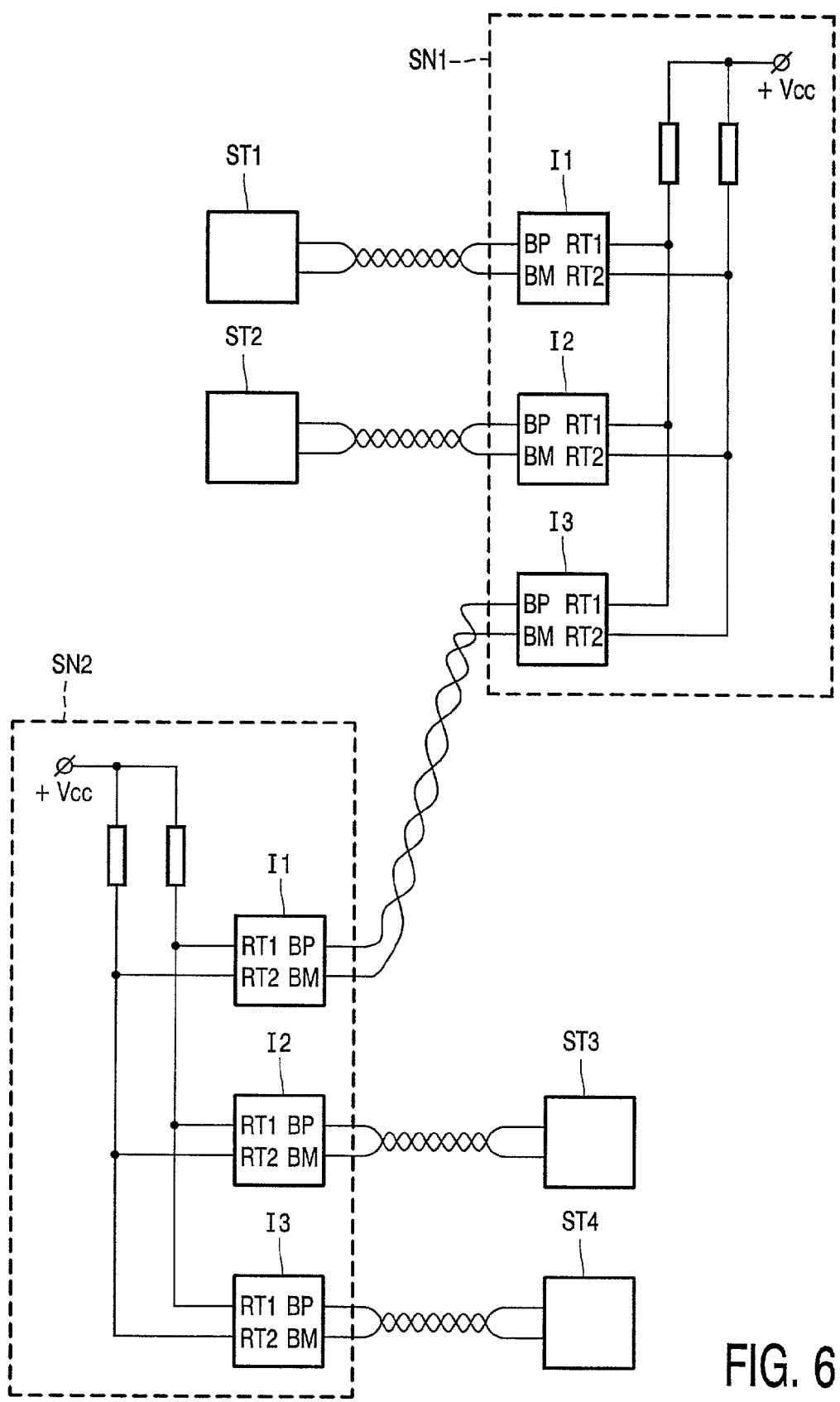

FIG. 6 shows the network of FIG. 1 in which one of the stations has been replaced by another star node SN2. The connection terminals BP, BM of the third interface I3 of star node SN1 are now connected to the corresponding connection terminals of, for example, the first interface I1 of a second star node SN2. The remaining interfaces of the star nodes SN1 and SN2 are connected to stations. In this way the number of star nodes and stations can be increased at will.

The interfaces and stations shown in the Figures have fully balanced circuitry. However, single ended versions are possible as well. Also a mixture of, for example, balanced connection terminals BP, BM and a single common terminal is possible. The combined function of receiver and the first switching means SW1 may also be implemented with a switched gain amplifier. The same applies to the combined function of transmitter and second switching means.

The invention claimed is:

1. A star node for interconnecting a plurality of stations in a network, the star node comprising interfaces each having a connection terminal for connecting a selected one of the stations to the star node, each interface having means for accepting at the connection terminal a signal from the station associated with the interface and for forwarding said signal to the connection terminal of the other interfaces, characterized in that the star node comprises a common terminal and in that the interface comprises a receiver having an input coupled to the connection terminal for receiving the signal from the associated station, a transmitter having an output coupled to the connection terminal, a first activity detector for generating a first activity signal in response to signal transitions at the input of the receiver, a second activity detector for generating a second activity signal in response to signal transitions at the common terminal, a first switching means for disabling signal transfer from an output of the receiver to the common terminal in response to the second activity signal, and a second switching means for disabling signal transfer from the common terminal to an input of the transmitter in response to the first activity signal.

2. A star node as claimed in claim 1, wherein the star node further comprises: a resistor for coupling the common terminal to a first supply voltage terminal, and wherein the first switching means comprises a driver having a driving input for receiving a driving signal for providing a conduction path between the common terminal and a second supply voltage terminal in response to the driving signal, and a first electronic switch responsive to the second activity signal, inserted between the output of the receiver and the driving input of the driver, and wherein the second switching means comprises a second electronic switch responsive to the first activity signal, inserted between the common terminal and the input of the transmitter.

3. A star node as claimed in claim 2, wherein the first activity detector has an input connected to the driving input of the driver and the second activity detector has an input connected to the input of the transmitter, the first electronic switch being closed in response to a value of the second activity signal which is indicative of no signal transitions at the input of the second activity detector and the second electronic switch being closed in response to a value of the first activity signal which is indicative of no signal transitions at the input of the first activity detector.

4. A star node as claimed in claim 2, wherein the driver is a transistor having its main current conduction path inserted between the common terminal and the second supply terminal and having its control electrode coupled to the driving input.

5. A star node as claimed in claim 4, wherein the star node further comprises a further resistor for coupling a further common terminal to the first supply voltage terminal and wherein the interface comprises a further connection terminal and a termination resistor connected between the connection terminal and the further connection terminal, wherein the receiver comprises first and second comparators having corresponding inputs oppositely connected to the connection terminal and the further connection terminal and having respective comparator outputs, the first electronic switch being inserted between one of the comparator outputs and the control electrode of the transistor, wherein the first switching means comprises a further first electronic switch responsive to the second activity signal similarly to the first electronic switch, and a further transistor having its main current conduction path inserted between the further common terminal and the second supply terminal and having a control electrode, the further first electronic switch being inserted between the other one of the comparator outputs and the control electrode of the further transistor, wherein the transmitter has non-inverting and inverting inputs and balanced outputs, the balanced outputs of the transmitter being connected to a respective one of the connection terminal and the further terminal, the second electronic switch being inserted between the common terminal and one of the non-inverting and inverting inputs of the transmitter, wherein the second switching means comprises a further second electronic switch responsive to the first activity signal similarly to the second electronic switch, inserted between the further common terminal and the other one of the non-inverting and inverting inputs of the transmitter, and wherein the first activity detector has an additional input connected to the control electrode of the further transistor and the second activity detector has the input and an additional input connected to respective ones of the non-inverting and inverting inputs of the transmitter.

6. A star node as claimed in claim 2, wherein the first activity detector has an input connected to the output of the receiver and the second activity detector has an input connected to the common terminals, the first electronic switch being closed in response to a value of the second activity signal which is indicative of no signal transitions at the input of the second activity detector and the second electronic switch being closed in response to a value of the first activity signal which is indicative of no signal transitions at the input of the first activity detector.

7. A star node as claimed in claim 2, wherein the driver is a transistor having its main current conduction path inserted between the common terminal and the second supply terminal and having its control electrode coupled to the driving input.

8. A star node as claimed in claim 7, wherein the star node further comprises a further resistor for coupling a further common terminal to the first supply voltage terminal and wherein the interface comprises a further connection terminal and a termination resistor connected between the connection terminal and the further connection terminal, wherein the receiver comprises first and second comparators having corresponding inputs oppositely connected to the connection terminal and the further connection terminal and having respective comparator outputs, the first electronic switch being inserted between one of the comparator outputs and the control electrode of the transistor, wherein the first switching means comprises a further first electronic switch responsive to the second activity signal similarly to the first electronic switch, and a further transistor having its main current conduction path inserted between the further common terminal and the second supply terminal and having a control electrode, the further first electronic switch being inserted between the other of the comparator outputs and the control electrode of the further transistor, wherein the transmitter has non-inverting and inverting inputs and balanced outputs, the balanced outputs of the transmitter being connected to a respective one of the connection terminal and the further terminal, the second electronic switch being inserted between the common terminal and one of the non-inverting and inverting inputs of the transmitter, wherein the second switching means comprises a further second electronic switch responsive to the first activity signal similarly to the second electronic switch, inserted between the further common terminal and the other one of the non-inverting and inverting inputs of the transmitter, and wherein the first activity detector has an additional input connected to the other one of the comparator outputs and the second activity detector has the input and an additional input connected to respective ones of the common terminal and the further common terminal.

* * * * *